(12) United States Patent  
Eriksson et al.

(10) Patent No.: US 12,431,696 B2  
(45) Date of Patent: Sep. 30, 2025

(54) RIGID SUBMARINE POWER CABLE JOINT

(71) Applicant: NKT HV Cables AB, Lyckeby (SE)

(72) Inventors: Erik Eriksson, Växjö (SE); Andreas Tyrberg, Lyckeby (SE); Björn Zettervall, Nättraby (SE)

(73) Assignee: NKT HV Cables AB, Lyckeby (CH)

( * ) Notice: Subject to any disclaimer, the term of this patent is extended or adjusted under 35 U.S.C. 154(b) by 199 days.

(21) Appl. No.: 18/340,502

(22) Filed: Jun. 23, 2023

(65) Prior Publication Data

US 2024/0006865 A1  Jan. 4, 2024

(30) Foreign Application Priority Data

Jun. 30, 2022 (EP) .................................... 22182293

(51) Int. Cl.
| | |
|---|---|
| *H02G 9/02* | (2006.01) |
| *G02B 6/44* | (2006.01) |
| *H01B 7/02* | (2006.01) |
| *H01B 7/04* | (2006.01) |
| *H01B 7/12* | (2006.01) |
| *H01B 7/14* | (2006.01) |
| *H01B 7/282* | (2006.01) |
| *H01B 11/22* | (2006.01) |
| *H01B 17/58* | (2006.01) |
| *H02G 1/10* | (2006.01) |

(52) U.S. Cl.
CPC ............. *H02G 9/02* (2013.01); *H01B 7/0225* (2013.01); *H01B 7/14* (2013.01); *H01B 7/2825* (2013.01); *H01B 11/22* (2013.01); *H01B 17/58* (2013.01)

(58) Field of Classification Search
CPC .......... H01B 7/14; H01B 7/282; H02G 15/10; H02G 15/08; G02B 6/4427
See application file for complete search history.

(56) References Cited

U.S. PATENT DOCUMENTS

2016/0054535 A1* 2/2016 Toth ..................... G02B 6/545  
                                                     385/135

FOREIGN PATENT DOCUMENTS

| CN | 209881368 U | * | 12/2019 |
| EP | 3336993 B1 | | 11/2021 |
| SE | 1600089 A1 | | 3/2016 |

OTHER PUBLICATIONS

Weerheim, Ruben; "Development of dynamic power cables for commercial floating wind farms"; Report Literature Assignment; Nov. 12, 2018; 67 Pages.
Extended European Search Report; Application No. 22182293.5; Completed: Nov. 18, 2022; Issued: Dec. 6, 2022; 12 Pages.

* cited by examiner

*Primary Examiner* — Timothy J Thompson  
*Assistant Examiner* — Amol H Patel  
(74) *Attorney, Agent, or Firm* — Whitmyer IP Group LLC

(57) ABSTRACT

A rigid submarine power cable joint including: an outer casing having a first axial end face and a second axial end face at an opposite axial end of the outer casing relative to the first axial end face, wherein the first axial end face includes a single opening configured to receive a multi-core dynamic submarine power cable, and wherein the second axial end face includes two openings, each configured to receive a respective single core submarine power cable.

17 Claims, 3 Drawing Sheets

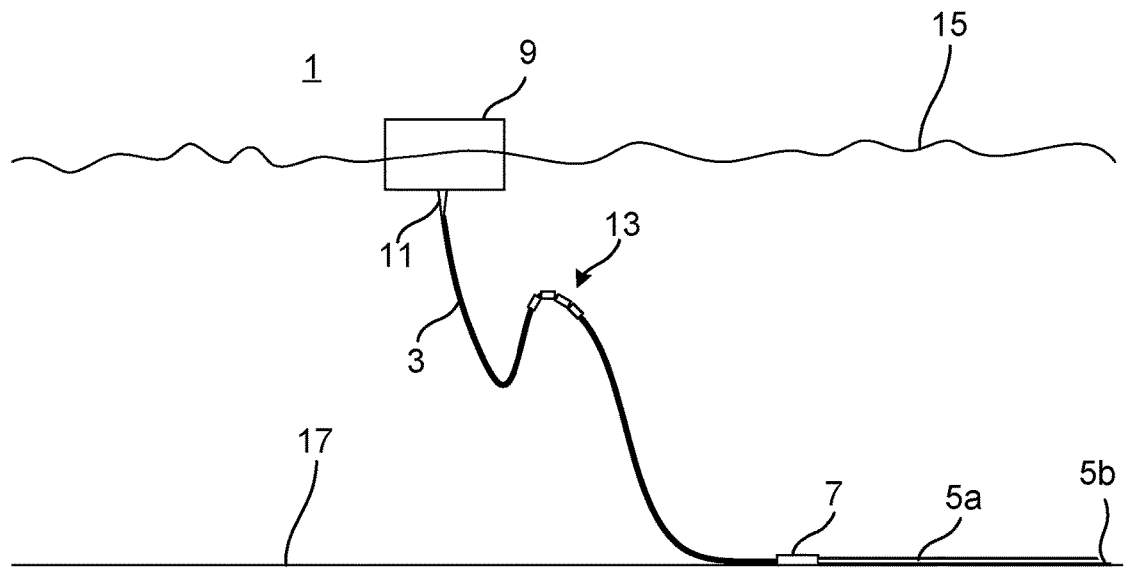
Fig. 1
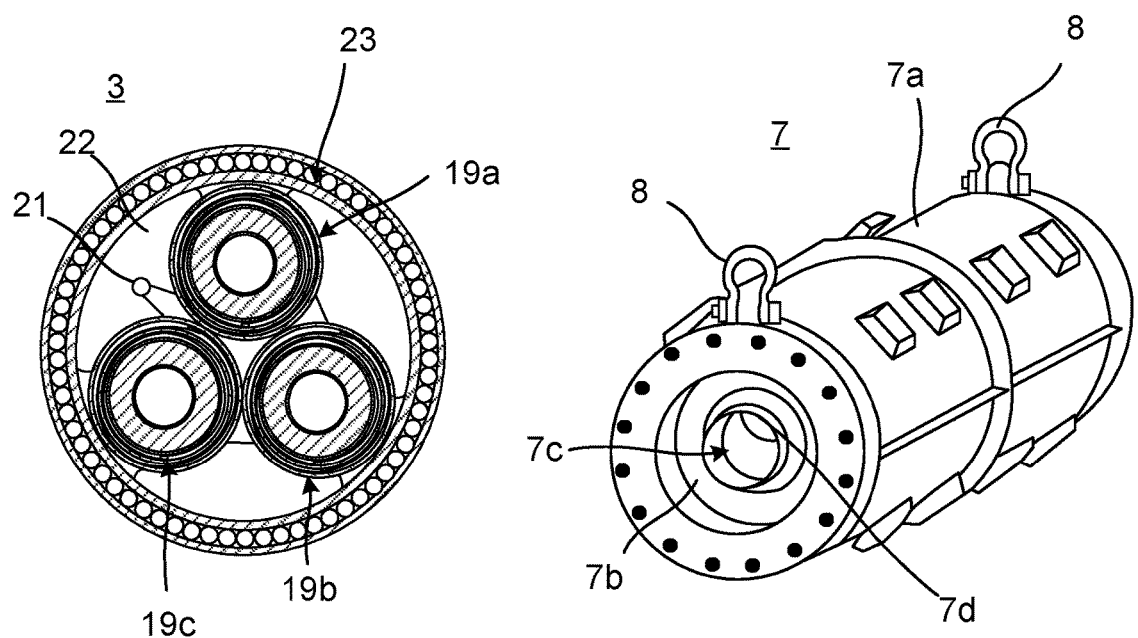
Fig. 2
Fig. 3a

RIGID SUBMARINE POWER CABLE JOINT

TECHNICAL FIELD

The present disclosure generally relates to submarine power cable systems.

BACKGROUND

Offshore structures such as floating wind turbines are typically connected to a dynamic submarine power cable for power transportation. Dynamic submarine power cables are designed to withstand stress created by wave motion.

The dynamic submarine power cable extends from the floating offshore structure to the seabed where it may be jointed with a static submarine power cable that is laid on the seabed.

In existing offshore installations, the dynamic submarine power cables are generally AC power cables. There is however an increased interest in dynamic DC submarine power cables.

A dynamic DC submarine cable system suspended from an offshore structure to the seabed would have to include two dynamic DC submarine power cables, one for each electric pole. This requires two sets of buoyancy units, anchoring, bend stiffeners, etc.—one for each power cable. Two dynamic DC submarine power cables furthermore take up a larger water column than a single dynamic AC submarine cable.

It would thus be desirable to incorporate two DC cable cores in a single multi-core, preferably triple-core, dynamic submarine power cable. There are however currently no connectors or joints on the market that could connect a multi-core DC dynamic submarine power cable to a static submarine power cable on the seabed.

SUMMARY

A general object of the present disclosure is to provide a rigid submarine power cable joint which solves or at least mitigates problems of the prior art.

There is hence according to a first aspect of the present disclosure provided a rigid submarine power cable joint comprising: an outer casing having a first axial end face and a second axial end face at an opposite axial end of the outer casing relative to the first axial end face, wherein the first axial end face comprises a single opening configured to receive a multi-core dynamic submarine power cable, and wherein the second axial end face comprises two openings, each configured to receive a respective single core submarine power cable.

A jointing between a multi-core dynamic submarine power cable and two single core submarine power cables may thus be achieved.

The single opening may have a circular cross-sectional shape.

Each of the two openings may have a circular cross-sectional shape.

The single opening is a through-opening.

The two openings are through-openings.

The single opening may be the only opening configured to receive a multi-core dynamic submarine power cable in the first axial end face. There is thus only one opening, i.e., the single opening, provided in the first axial end face, configured to receive a multi-core dynamic submarine power cable.

The two openings may be the only openings configured to receive a respective single core submarine power cable in the second axial end face.

There is thus only two opening, i.e., the two opening, provided in the second axial end face, configured to receive a respective single core submarine power cable.

According to one embodiment the first axial end face comprises a multi-core dynamic submarine power cable armour attachment structure arranged around the single opening and configured for attaching armour wires of the multi-core dynamic submarine power cable.

The multi-core dynamic submarine power cable armour attachment structure may for example be a weld sleeve for welding the armour wires of the multi-core dynamic submarine power cable to the weld sleeve. The armour wires of the multi-core dynamic submarine power cables can thus be welded to the outer casing as they are terminated.

Alternatively, the multi-core dynamic submarine power cable armour attachment structure may be a clamping member such as a clamping flange, for clamping the armour wires of the multi-core dynamic submarine power cable to the outer casing.

According to one embodiment the second axial end face comprises two single core submarine power cable armour attachment structures, each single core submarine power cable armour attachment structure being arranged around a respective one of the two openings, wherein each single core submarine power cable armour attachment structure is configured for attaching armour wires of a respective one of the single core submarine power cables.

The two single core submarine power cable armour attachment structures may for example be weld sleeves for welding the armour wires of the single core submarine power cables to a respective weld sleeve. The armour wires of the singe core submarine power cables can thus be welded to the outer casing as they are terminated.

Alternatively, each of the two single core submarine power cable armour attachment structures may be a clamping member such as a clamping flange, for clamping the armour wires of the two single core submarine power cables to the outer casing.

According to one embodiment the second axial end face comprises a third opening configured to receive an armoured submarine optical fibre cable, wherein the second axial end face comprises a submarine optical fibre armour attachment structure arranged around the third opening and configured for attachment of armour wires of the armoured submarine optical fibre cable.

The submarine optical fibre armour attachment structure may for example be a weld sleeve for welding the armour wires of the armoured submarine optical fibre cable to the weld sleeve. The armour wires of the armoured submarine optical fibre cable can thus be welded to the outer casing as they are terminated.

Alternatively, submarine optical fibre armour attachment structure may be a clamping member such as a clamping flange, for clamping the armour wires of the armoured submarine optical fibre cable to the outer casing.

There is according to a second aspect of the present disclosure provided a submarine power cable system comprising: a rigid submarine power cable joint as claimed in any of the preceding claims, a multi-core dynamic submarine power cable comprising a first power core and a second power core, each of the first power core and the second power core comprising a respective conductor, a respective insulation system arranged around the conductor and a respective metallic water-blocking layer arranged around the insulation layer, the multi-core dynamic submarine power cable extending through the single opening, a first single core submarine power cable in the form of a first static submarine power cable extending through a first of the two openings, and a second single core submarine power cable in the form of a second static submarine power cable extending through a second of the two openings, wherein each of the first static submarine power cable and the second static submarine power cable comprises a respective conductor, a respective insulation system, and a respective metallic water-blocking layer arranged around the insulation system, and wherein the first power core is jointed with the first static submarine power cable inside the outer casing, and wherein the second power core is jointed with the second static submarine power cable inside the outer casing.

According to one embodiment the rigid submarine power cable joint comprises a first prefabricated joint connecting the first power core with the first static submarine power cable and a second prefabricated joint connecting the second power core with the second static submarine power cable.

One embodiment comprises an elongated first inner case arranged around the first prefabricated joint, wherein the metallic water-blocking layer of the first power core is soldered or welded to a first end of the first inner case and the metallic water-blocking layer of the first static submarine power cable is soldered or welded to a second end of the first inner case.

One embodiment comprises an elongated second inner case arranged around the second prefabricated joint, wherein the metallic water-blocking layer of the second power core is soldered or welded to a first end of the second inner case and the metallic water-blocking layer of the second static submarine power cable is soldered or welded to a second end of the second inner case.

According to one embodiment the multi-core dynamic submarine power cable comprises an elongated element which is stranded with the first power core and the second power core, wherein the rigid submarine power cable joint comprises an elongated element end cap, and wherein an end face of the elongated element is sealed inside the outer casing by the elongated element end cap.

According to one embodiment the elongated element is a third power core comprising a conductor, an insulation system arranged around the conductor and a metallic water-blocking layer arranged around the insulation layer.

Alternatively, the elongated element could be a structure which has similar mechanical characteristics as the first power core and the second power core with regards to weight, dimension, and bending stiffness. For example, the weight of the elongated element could be within 90-100% of the weight of one of the first and the second power core, and the diameter of the elongated element may be within 90-100% of the diameter of one of the first and the second power core. For example, the bending stiffness of the elongated element could be within 90-100% of the bending stiffness of one of the first and the second power core. The first and the second power core generally have the same weight, diameter and bending stiffness.

The first power core, the second power core, and the third power core may be stranded together. The multi-core dynamic submarine power cable may thus have a circular cross-sectional shape, which simplifies handling of the multi-core dynamic submarine power cable during production, transport, and installation.

The third power core may have the same or essentially the same outer diameter as the outer diameter of the first power core and the second power core. For example, the outer diameter of the third power core may be in a range of 95-105% of the outer diameter of each of the first power core and the second power core.

The third power core may be a dummy power core identical to the first and the second power core, which is electrically unconnected at both ends of the multi-core dynamic submarine power cable. The third power core thus provides symmetry to the multi-core dynamic submarine power cable with regards to shape and topology/structure, and therefore its mechanical behaviour.

According to one embodiment the multi-core dynamic submarine power cable, the first static submarine power cable, and the second static submarine power cable are DC power cables.

The multi-core dynamic submarine power cable, the first static submarine power cable, and the second static submarine power cable may be HVDC power cables.

According to one embodiment the multi-core dynamic submarine power cable comprises armour wires attached to the multi-core dynamic submarine power cable armour attachment structure, the first static submarine power cable comprises armour wires attached to one of the single submarine power cable armour attachment structures, and the second static submarine power cable comprises armour wires attached to the other one of the single submarine power cable armour attachment structures.

According to one embodiment the submarine power cable system comprises an armoured submarine optical fibre cable comprising armour wires attached to the submarine optical fibre armour attachment structure, wherein the multi-core dynamic submarine power cable comprises a fibre optic cable, and wherein the rigid submarine power cable joint comprises a fibre optic cable joint jointing the fibre optic cable with the submarine optical fibre cable inside the outer casing.

According to one embodiment the armoured submarine optical fibre cable, the first static submarine power cable, and the second static submarine power cable are bundled together along their length of extension by means of tape, cord, wire, or yarn.

One embodiment comprises a first bend restrictor connected to the first axial end face of the outer casing and extending around and along a portion of the multi-core dynamic submarine power cable outside the outer casing, and two second bend restrictors, each connected to the second axial end face of the outer casing and extending around and along a portion of a respective one of the first static submarine power cable and the second static submarine power cable outside the outer casing.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which:

FIG. 1. schematically shows an example of a submarine power cable system;

FIG. 2 schematically shows a cross-section of an example of a multi-core dynamic submarine power cable;

FIG. 3a schematically shows an example of a perspective view of a rigid submarine power cable joint, depicting one axial end thereof;

DETAILED DESCRIPTION

Figure 3B:
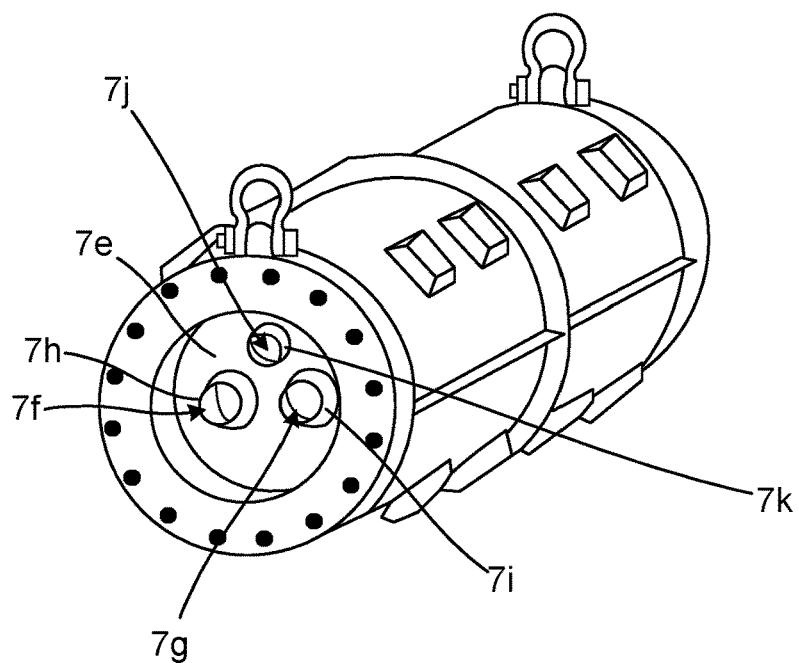
FIG. 3b schematically shows a perspective view of the rigid submarine power cable joint in FIG. 3a, depicting the other axial end thereof.

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

FIG. 1 schematically shows an example of a submarine power cable system 1. The exemplified submarine power cable system is a DC submarine power cable system 1.

The submarine power cable system 1 comprises a multi-core dynamic submarine power cable 3, a first single core submarine power cable 5a in the form of a first static submarine power cable, a second single core submarine power cable 5b in the form of a second static submarine power cable, and a rigid submarine power cable joint 7.

The multi-core dynamic submarine power cable 3 is a DC power cable, such as an HVDC power cable.

The first single core submarine power cable 5a is a DC power cable, such as an HVDC power cable.

The second single core submarine power cable 5b is a DC power cable, such as an HVDC power cable.

The rigid submarine power cable joint 7 connects the multi-core dynamic submarine power cable 3 with each of the first single core submarine power cable 5a and the second single core submarine power cable 5b.

The multi-core dynamic submarine power cable 3 extends between a floating platform 9 that floats on the surface of a body of water 15, and the seabed 17.

The floating platform 9 may for example be a floating wind turbine, a floating substation, or a floating production storage and offloading unit.

The first single core submarine power cable 5a and the second single core submarine power cable 5b are laid on the seabed 17.

The rigid submarine power cable joint 7 is arranged on the seabed 17.

The submarine power cable system 1 may comprise an armoured submarine optical fibre cable. The armoured submarine optical fibre cable may be external to and bundled together with the first single core submarine power cable 5a and the second single core submarine power cable 5b along their length of extension to the rigid submarine power cable joint 7 by means of tape, cord, wire, or yarn.

A bend stiffener 11 is connected to the floating platform 9. The multi-core dynamic submarine power cable 3 extends through the bend stiffener 11 and is terminated at the floating platform 9.

The submarine power cable system 1 may comprise one or more buoyancy units 13 connected to the multi-core dynamic submarine power cable 3 to provide a midwater lift of the multi-core dynamic submarine power cable 3.

The multi-core dynamic submarine power cable 3 comprises a first power core 19a and a second power core 19b.

The first power core 19a may be a first pole. The second power core 19b may be a second pole.

The multi-core dynamic submarine power cable 3 may be used in bi-polar operation provided by means of the first power core 19a and the second power core 19b.

The first power core 19a comprises a respective conductor, a respective insulation system arranged around the conductor and a respective metallic water-blocking layer arranged around the insulation layer.

The insulation systems may be polymer based, for example comprising cross-linked polyethylene (XLPE), polypropylene (PP), thermoplastic elastomer (TPE) which is based on PP random copolymer, ethylene propylene diene monomer (EPDM) rubber, or ethylene propylene rubber (EPR).

The multi-core dynamic submarine power cable 3 comprises an elongated element 19c which is stranded with the first power core 19a and the second power core 19b. The elongated element 19c may have the same or essentially the same outer diameter as the first power core 19 and the second power core 19b.

According to one example the elongated element 19c is a third power core comprising a conductor, an insulation system arranged around the conductor and a metallic water-blocking layer arranged around the insulation layer. The insulation system of the third power core may be of the same material as the first power core 19a and the second power core 19b.

The elongated element 19c may according to one example be identical to one or both of the first power core 19a and the second power core 19b.

The multi-core dynamic submarine power cable 3 may comprise a fibre optic cable 21.

The multi-core dynamic submarine power cable 3 may comprise filler profiles 22, each being arranged between two adjacent power cores 19a, 19b and/or elongated element 19c. The fibre optic cable 21 may be arranged in an opening in one of the filler profiles 22.

The multi-core dynamic submarine power cable 3 comprises an armour layer 23 arranged around the stranded first power core 19a, the second power core 19b, and the elongated element 19c. The armour layer 23 comprises armour wires wound helically around the first power core 19a, the second power core 19b, and the elongated element 19c.

The armour wires may comprise metal such as steel, e.g., galvanized steel or stainless steel.

The multi-core dynamic submarine power cable may alternatively comprise more than one armour layer, such as two, three, or four armour layers.

Each of the first and the second single core submarine power cables 5a, 5b comprises a conductor, an insulation system surrounding the conductor, a metallic water-blocking layer arranged around the insulation system, and an armour layer arranged around the metallic water-blocking layer.

The insulation systems of the first and the second single core submarine power cables 5a, 5b may be polymer based, for example comprising XLPE, polypropylene PP, TPE which is based on PP random copolymer, EPDM rubber, or EPR.

FIG. 3a shows an example of the rigid submarine power cable joint 7.

The rigid submarine power cable joint 7 comprises an outer casing 7a. The outer casing 7a is made of metal, for example steel, such as stainless steel.

The outer casing 7a may have a top side provided with a plurality of loops 8, each being provided at a respective axial end of the outer casing 7a. The outer casing 7a may be lifted and moved by a lifting device such as a crane by connecting a respective hook of the lifting device to the loops 8.

The outer casing 7a has a first axial end face 7b. The first axial end face 7b comprises a single opening 7c configured to receive the multi-core dynamic submarine power cable 3. The first power core 19a, the second power core 19b and the elongated element 19c all extend through the single opening 7c into the interior of the outer casing 7a.

The first axial end face 7b comprises a multi-core dynamic submarine power cable armour attachment structure 7d arranged around the single opening 7c. The multi-core dynamic submarine power cable armour attachment structure 7d is in the present example a weld sleeve which has a longitudinal extension parallel with a longitudinal axis of the outer casing 7a.

When jointing has been completed, the armour wires of the multi-core dynamic submarine power cable 3 have been cut off in a region where the multi-core dynamic submarine power cable 3 enters the outer casing 7a, and the ends have been welded to the multi-core dynamic submarine power cable armour attachment structure 7d. In case the multi-core dynamic submarine power cable armour attachment structure 7d would be a clamping member such as a clamping flange, the armour wires would be clamped between flanges.

In case the multi-core dynamic submarine power cable 3 comprises several armour layers, the multi-core dynamic submarine power cable sleeve 7d may be arranged in several radial steps or levels, with each step or level being configured to be welded to armour wires of a respective armour layer.

FIG. 3b shows the rigid submarine power cable joint 7 from its other axial end.

The outer casing 7a has a second axial end face 7e at an opposite axial end of the outer casing 7a relative to the first axial end face 7b.

The second axial end face 7e comprises two openings 7f and 7g. Each of the two openings 7f and 7g is configured to receive a respective one of the single core submarine power cable 5a and 5b, i.e., the first and second static submarine power cables.

The second axial end face 7e comprises two single core submarine power cable armour attachment structures 7h, 7i. Each single core submarine power cable armour attachment structure 7h, 7i is arranged around a respective one of the two openings 7f, 7g. Each single core submarine power cable armour attachment structure 7h, 7i has a longitudinal extension parallel with the longitudinal axis of the outer casing 7a.

When jointing has been completed, the armour wires of the first and second single core submarine power cables 5a, 5b have been cut off in a region where the first and second single core submarine power cables 5a, 5b enter the outer casing 7a and the ends have been welded to a respective one of the single core submarine power cable armour attachment structure 7h, 7i. In case the single core submarine power cable armour attachment structures 7h, 7i would be clamping members such as clamping flanges, the armour wires would be clamped between flanges.

The second axial end face 7e may comprise a third opening 7j. The third opening 7j is a through-opening. The third opening 7j may have a smaller cross-sectional area or size, than the two openings 7f and 7g.

The third opening 7j is configured to receive an armoured submarine optical fibre cable.

The third opening 7j may for example be arranged vertically above the two openings 7f and 7g.

The second axial end face 7e may comprise a submarine optical fibre armour attachment structure 7k arranged around the third opening 7j. The submarine optical fibre armour attachment structure 7k has a longitudinal extension parallel with the longitudinal axis of the outer casing 7a.

When jointing has been completed, the armour wires of an armoured submarine optical fibre cable have been cut off in a region where the first and second single core submarine power cables 5a, 5b and the ends have been welded to the submarine optical fibre armour attachment structure 7k. In case the submarine optical fibre armour attachment structure 7k would be a clamping member such as clamping flange, the armour wires would be clamped between flanges.

Figure 4:
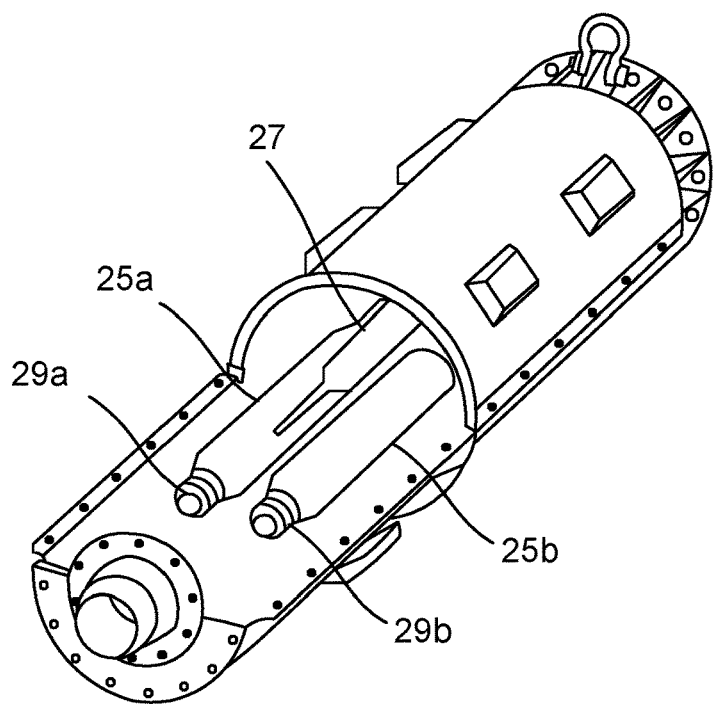
FIG. 4 shows a perspective view of the rigid submarine power cable joint partially opened.

FIG. 4 shows a perspective view of the rigid submarine power cable joint 7 partially opened to expose interior components thereof.

The rigid submarine power cable joint 7 comprises a first prefabricated joint (not shown), alternatively called a pre-moulded joint, connecting the first power core 19a with the first static submarine power cable 5a.

The rigid submarine power cable joint 7 comprises a second prefabricated joint (not shown), alternatively called a pre-moulded joint, connecting the second power core 19b with the second static submarine power cable 5b.

The first prefabricated joint comprises an elastomeric sleeve connecting the insulation systems of the first power core 19a and the first static submarine power cable 5a.

The second prefabricated joint comprises an elastomeric sleeve connecting the insulation systems of the second power core 19b and the second static submarine power cable 5b.

The rigid submarine power cable joint 7 comprises an elongated first inner case 25a arranged around the first prefabricated joint. The first inner case 25a may be made of a metallic material such as steel, e.g., stainless steel.

The metallic water-blocking layer of the first power core 19a is soldered or welded to a first end 29a of the first inner case 25a. A waterproof connection between the first power core 19a and the first inner case 25a is thus obtained.

The metallic water-blocking layer of the first single core submarine power cable 5a is soldered or welded to a second end of the first inner case 25a. A waterproof connection between the first single core submarine power cable 5a and the first inner case 25a is thus obtained.

The rigid submarine power cable joint 7 comprises an elongated second inner case 25b arranged around the second prefabricated joint. The second inner case 25b may be made of a metallic material such as steel, e.g., stainless steel.

The metallic water-blocking layer of the second power core 19b is soldered or welded to a first end 29b of the second inner case 25b. A waterproof connection between the second power core 19b and the second inner case 25b is thus obtained.

The metallic water-blocking layer of the second static submarine power cable 5b is soldered or welded to a second end of the second inner case 25b. A waterproof connection between the second static submarine power cable 5b and the second inner case 25b is thus obtained.

The rigid submarine power cable joint 7 may comprise an elongated element end cap (now shown), which receives and seals an end face of the elongated element 19c inside the outer casing, thereby sealing the elongated element 19c from water penetration. The elongated element 19c is thus not electrically connected to any object inside the outer casing 7a. The elongated element 19c may also not be connected electrically to any equipment on the floating platform 9.

The rigid submarine power cable joint 7 may comprise a fibre optic cable joint 27 jointing the fibre optic cable 21 with the submarine optical fibre cable inside the outer casing 7.

Figure 5:
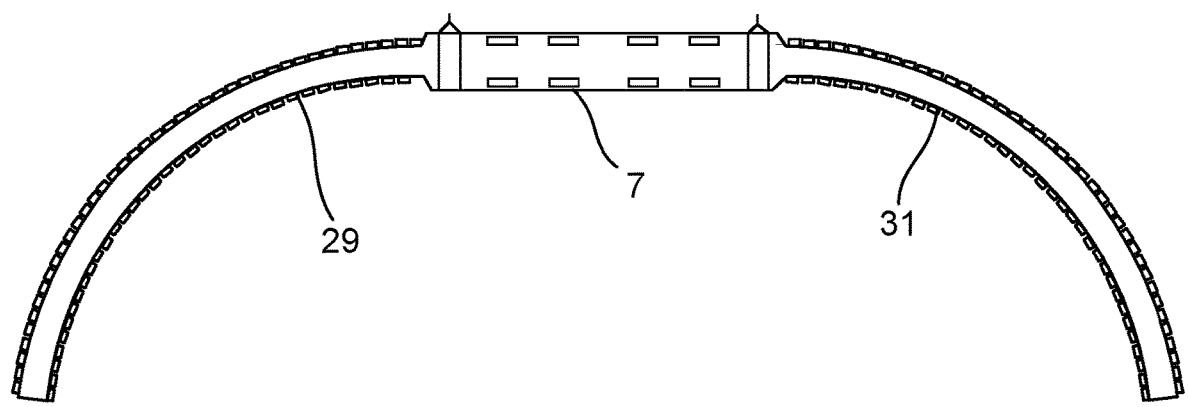
FIG. 5 is a side view of a submarine power cable system comprising the rigid submarine power cable joint.

Referring to FIG. 5, the submarine power cable system 1 may comprise a plurality of bend restrictors 29, 31 configured to restrict bending of the cables 3, 5a, and 5b when the rigid submarine power cable joint 7 with the cables 3, 5a, and 5b connected thereto is moved, for example when the rigid submarine power cable joint 7 is lowered to the seabed 17.

The bend restrictors 29, 31 are connected to the outer casing 7a and extend around a portion of a respective one of the cables 3, 5a and 5b and are configured to restrict bending of the cables 3, 5a and 5b in a region of e.g., up to 5 or 10 metres from the outer casing 7a in the direction of extension of the cables 3, 5a, 5b from the outer casing 7a.

A first bend restrictor 29 may be connected to the first axial end face 7b of the outer casing 7a. The first bend restrictor 29 may extend around and along a portion of the multi-core dynamic submarine power cable 3 outside the outer casing 7a. Two second bend restrictors, of which one is shown and denoted by reference number 31, are connected to the second axial end face 7e of the outer casing 7a. Each second bend restrictor may extend around and along a portion of a respective one of the first static submarine power cable 5a and the second static submarine power cable 5b outside the outer casing 7a.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A rigid submarine power cable joint comprising:
an outer casing having a first axial end face and a second axial end face at an opposite axial end of the outer casing relative to the first axial end face,
wherein the first axial end face comprises a single opening configured to receive a multi-core dynamic submarine power cable,
wherein the second axial end face includes two openings, each configured to receive a respective single core submarine power cable, and
wherein the second axial end face comprises a third opening configured to receive an armoured submarine optical fibre cable, wherein the second axial end face includes a submarine optical fibre armour attachment structure arranged around the third opening and configured for attaching armour wires of the armoured submarine optical fibre cable.

2. The rigid submarine power cable joint as claimed in claim 1, wherein the first axial end face comprises a multi-core dynamic submarine power cable armour attachment structure arranged around the single opening and configured for attaching armour wires of the multi-core dynamic submarine power cable.

3. The rigid submarine power cable joint as claimed in claim 1, wherein the second axial end face comprises two single core submarine power cable armour attachment structures, each single core submarine power cable armour attachment structure being arranged around a respective one of the two openings, wherein each single core submarine power cable armour attachment structure is configured for attaching armour wires of a respective one of the single core submarine power cables.

4. A submarine power cable system comprising:
a rigid submarine power cable joint wherein an outer casing having a first axial end face and a second axial end face at an opposite axial end of the outer casing relative to the first axial end face,
wherein the first axial end face comprises a single opening configured to receive a multi-core dynamic submarine power cable,
wherein the second axial end face includes two openings, each configured to receive a respective single core submarine power cable,
a multi-core dynamic submarine power cable comprising a first power core and a second power core, each of the first power core and the second power core including a respective conductor, a respective insulation system arranged around the conductor and a respective metallic water-blocking layer arranged around the insulation layer,
the multi-core dynamic submarine power cable extending through the single opening,
a first single core submarine power cable in the form of a first static submarine power cable extending through a first of the two openings, and
a second single core submarine power cable in the form of a second static submarine power cable extending through a second of the two openings, wherein each of the first static submarine power cable and the second static submarine power cable includes a respective conductor, a respective insulation system, and a respective metallic water-blocking layer arranged around the insulation system, and
wherein the first power core is jointed with the first static submarine power cable inside the outer casing, and wherein the second power core is jointed with the second static submarine power cable inside the outer casing.

5. The submarine power cable system as claimed in claim 4, wherein the rigid submarine power cable joint includes a first prefabricated joint connecting the first power core with the first static submarine power cable and a second prefabricated joint connecting the second power core with the second static submarine power cable.

6. The submarine power cable system as claimed in claim 5, comprising an elongated first inner case arranged around the first prefabricated joint, wherein the metallic water-blocking layer of the first power core is soldered or welded to a first end of the first inner case and the metallic water-blocking layer of the first static submarine power cable is soldered or welded to a second end of the first inner case.

7. The submarine power cable system as claimed in claim 6, comprising an elongated second inner case arranged around the second prefabricated joint, wherein the metallic water-blocking layer of the second power core is soldered or welded to a first end of the second inner case and the metallic water-blocking layer of the second static submarine power cable is soldered or welded to a second end of the second inner case.

8. The submarine power cable system as claimed in claim 4, wherein the multi-core dynamic submarine power cable comprises an elongated element which is stranded with the first power core and the second power core, wherein the rigid submarine power cable joint includes an elongated element end cap, and wherein an end face of the elongated element is sealed inside the outer casing by the elongated element end cap.

9. The submarine power cable system as claimed in claim 8, wherein the elongated element is a third power core including a conductor, an insulation system arranged around the conductor and a metallic water-blocking layer arranged around the insulation layer.

10. The submarine power cable system as claimed in claim 4, wherein the multi-core dynamic submarine power cable, the first static submarine power cable, and the second static submarine power cable are DC power cables.

11. The submarine power cable system as claimed in claim 4, wherein the rigid submarine power cable joint includes the second axial end face comprising two single core submarine power cable armour attachment structures, each single core submarine power cable armour attachment structure being arranged around a respective one of the two openings, wherein each single core submarine power cable armour attachment structure is configured for attaching armour wires of a respective one of the single core submarine power cables, wherein the first axial end face comprises a multi-core dynamic submarine power cable armour attachment structure arranged around the single opening and configured for attaching armour wires of the multi-core dynamic submarine power cable, wherein the multi-core dynamic submarine power cable comprises armour wires welded to the multi-core dynamic submarine power cable armour attachment structure, the first static submarine power cable includes armour wires attached to one of the single submarine power cable armour attachment structures, and the second static submarine power cable includes armour wires attached to the other one of the single submarine power cable armour attachment structures.

12. The submarine power cable system as claimed in claim 4, wherein the rigid submarine power cable joint includes a second axial end face comprising a third opening configured to receive an armoured submarine optical fibre cable, wherein the second axial end face includes a submarine optical fibre armour attachment structure arranged around the third opening and configured for attaching armour wires of the armoured submarine optical fibre cable, wherein the submarine power cable system comprises an armoured submarine optical fibre cable including armour wires attached to the submarine optical fibre armour attachment structure, wherein the multi-core dynamic submarine power cable comprises a fibre optic cable, and wherein the rigid submarine power cable joint includes a fibre optic cable joint jointing the fibre optic cable with the submarine optical fibre cable inside the outer casing.

13. The submarine power cable system as claimed in claim 12, wherein the armoured submarine optical fibre cable, the first static submarine power cable, and the second static submarine power cable are bundled together along their length of extension by means of tape, cord, wire, or yarn.

14. The submarine power cable system as claimed in claim 4, comprising a first bend restrictor connected to the first axial end face of the outer casing and extending around and along a portion of the multi-core dynamic submarine power cable outside the outer casing, and two second bend restrictors, each connected to the second axial end face of the outer casing and extending around and along a portion of a respective one of the first static submarine power cable and the second static submarine power cable outside the outer casing.

15. The submarine power cable system as claimed in claim 4, wherein the second axial end face comprises two single core submarine power cable armour attachment structures, each single core submarine power cable armour attachment structure being arranged around a respective one of the two openings, wherein each single core submarine power cable armour attachment structure is configured for attaching armour wires of a respective one of the single core submarine power cables.

16. The submarine power cable system as claimed in claim 4, wherein the second axial end face comprises a third opening configured to receive an armoured submarine optical fibre cable, wherein the second axial end face includes a submarine optical fibre armour attachment structure arranged around the third opening and configured for attaching armour wires of the armoured submarine optical fibre cable.

17. The submarine power cable system as claimed in claim 4, wherein the first axial end face comprises a multi-core dynamic submarine power cable armour attachment structure arranged around the single opening and configured for attaching armour wires of the multi-core dynamic submarine power cable.

* * * * *